(12) United States Patent
Matsuyama et al.

(10) Patent No.: US 7,866,020 B2
(45) Date of Patent: Jan. 11, 2011

(54) METHOD FOR REPAIRING A CRACK IN AN ELECTROMECHANICAL ROTOR, METHOD FOR PREVENTING CRACK GROWTH IN THE SAME, ELECTROMECHANICAL ROTOR AND ROTARY ELECTRICAL MACHINE

(75) Inventors: Koji Matsuyama, Yokohama (JP); Hideki Chiba, Yokohama (JP); Hiromichi Ito, Tokyo (JP); Yomei Yoshioka, Yokohama (JP); Kazuhiro Saito, Yokohama (JP); Yasuo Kabata, Yokohama (JP); Ryoji Nagano, Yokohama (JP); Hiroaki Koinuma, Yokohama (JP); Kaname Hirai, Yokohama (JP); Toshio Kitajima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 886 days.

(21) Appl. No.: 11/645,508

(22) Filed: Dec. 27, 2006

(65) Prior Publication Data
US 2007/0169335 A1 Jul. 26, 2007

(30) Foreign Application Priority Data
Dec. 28, 2005 (JP) ............................ P2005-380345

(51) Int. Cl.
*B23P 6/00* (2006.01)
(52) U.S. Cl. .............. 29/402.09; 29/402.06; 29/402.07; 29/402.13; 29/402.16; 29/889.1

(58) Field of Classification Search ............... 29/402.01, 29/402.06, 402.07, 402.09, 402.11, 402.13, 29/402.16, 402.18, 402.19, 402.02, 402.05, 29/889.1
See application file for complete search history.

(56) References Cited

U.S. PATENT DOCUMENTS

| | | | | |
|---|---|---|---|---|
| 4,457,176 | A | * | 7/1984 | Scholz ........................ 73/624 |
| 6,849,972 | B1 | | 2/2005 | Barnes et al. |
| 2004/0216295 | A1 | * | 11/2004 | Bridges et al. ........... 29/402.09 |

FOREIGN PATENT DOCUMENTS

| | | |
|---|---|---|
| JP | 4-29304 | 5/1992 |
| JP | 5-74304 | 10/1993 |
| JP | 7-40774 | 5/1995 |
| JP | 7-44802 | 5/1995 |

* cited by examiner

*Primary Examiner*—David P Bryant
*Assistant Examiner*—Christopher Besler
(74) *Attorney, Agent, or Firm*—Finnegan, Henderson, Farabow, Garrett & Dunner, L.L.P.

(57) ABSTRACT

A method for repairing a crack in an electromechanical rotor (10), including forming a plurality of slots (12) on a periphery of a core portion (11) of an electromechanical rotor (10) along an axial direction thereof; inserting coils into the slots (12), respectively; forming a plurality of wedges for maintaining the coils in the slots (12), respectively; and forming a cut hole (20) at the core portion (11) from an outer surface of the core portion (11) so as to remove at least a deeper area of a crack created at the core portion (11) at a contacting surface between the corresponding wedge and the corresponding slot (12).

4 Claims, 9 Drawing Sheets

PRIOR ART

PRIOR ART

PRIOR ART

METHOD FOR REPAIRING A CRACK IN AN ELECTROMECHANICAL ROTOR, METHOD FOR PREVENTING CRACK GROWTH IN THE SAME, ELECTROMECHANICAL ROTOR AND ROTARY ELECTRICAL MACHINE

CROSS-REFERENCE TO RELATED APPLICATIONS

This application is based upon and claims the benefit of priority from the prior Japanese Patent Application No. 2005-380345 filed on Dec. 28, 2005; the entire contents of which are incorporated herein by reference.

BACKGROUND

1. Field of the Invention

The present invention., relates to a method for repairing a crack in an electromechanical rotor, a method for preventing crack growth in the electromechanical rotor, an electromechanical rotor and a rotary electrical machine where many slots, in which coils and wedges are inserted at the corresponding bottom portions and the corresponding top portions thereof, are provided at the periphery of the rotor core portion thereof along the axial direction so that in the slots, the coils can be fixed in the corresponding wedges.

2. Description of the Related Art

A rotor 300 of a conventional turbine generator will be described with reference to FIGS. 12-18.

FIG. 12 is a cross sectional view schematically showing a portion of the conventional rotor 300, and FIG. 13 is a partially cut away plan view schematically showing the rotor 300, perpendicular to the axial direction thereof. FIG. 14 is a perspective view schematically showing the fabrication state between a slot 303 and a wedge 305. FIG. 15 is a plan view showing a rotor shaft 301 under deformation. FIG. 16 is a perspective view showing the conventional rotor 300 of the turbine generator with cracks created at the rotor dove tail thereof. FIGS. 17 and 18 are plan views of the conventional rotor 300 for explaining a conventional repairing method for the cracks created at the rotor dove tail thereof.

As shown in FIGS. 12-14, the rotor 300 of the turbine generator includes the rotor shaft 301 and the core portion 302 formed integral with the rotor shaft 301. Then, many slots 303 are provided at the periphery of the core portion 302 thereof along the axial direction. Coils 304 are inserted into the bottom portions of the corresponding slots 303. Wedges 305 are provided on the corresponding coils 304 via corresponding insulating blocks 306 so as to be inserted into the ditches formed at the upper portions of the slots 303, respectively. In this case, the coils 304 can not be dropped off from in the corresponding slots 303 if the centrifugal force affects the slots 303 (coils 304) when the rotor shaft 301 is rotated.

The wedges 305 may be formed in any shape, but normally formed in dove tail as shown in FIG. 14. The wedges 305 may be formed in T-shape, Christmas tree-shape and the like. Since each slot 303 has some wedges 305, contacting edges 308 are formed between the adjacent wedges 305 at the corresponding contacting surfaces 307 between the wedges 305 and the slots 303. Surface pressures, originated from the centrifugal force, affect the contacting edges 308 and relative slips ±δ occur between the slots 303 (the core portion 302 of the rotor 300) and the wedges 305 when the core portion 302 of the rotor is rotated under the condition that the core portion 302 is curved due to the weight thereof or the bending vibration thereof by the curvature of "r", as shown in FIG. 15. In this case, relatively large tensile stresses and compressive stresses may occur and concentrated at the sides of the core portion 302 of the contacting edges 308 so that some fretting damages occur at the stress concentrating areas of the contacting edges 308 and thus, some cracks occur at the same areas.

As shown in FIG. 15, supposed that the radius of the core portion 302 of the rotor is defined as "$r_0$" and the length of the wedge 305 is defined as "L", the core portion 302 is expanded and extracted at the wedge edge by the amount of δ which can be represented by the equation (1) when the core portion 302 is shifted to the upper point A or lower point B. In this case, since the wedge 305 is provided along the axial direction of the rotor shaft 301, the wedge 305 can not be expanded and extracted by itself. Therefore, the relative slip of 2δ occurs at least one of the contacting edges 308 between the corresponding wedge 305 and the core portion 302 every one rotation of a rotor shaft 301.

$$\delta = r_0 \cdot L / 2r \quad (1)$$

In this way, if the relative slip occurs at the contacting edge 308 under the condition that a relatively large surface pressure is applied to the contacting edge 308, the fretting damage occurs at the contacting edge 308 so that a crack 309 may occur at the contacting surface 307.

Moreover, the crack 309, which occurs at the contacting surface 307 of the core portion 302 of the rotor, may be grown by the bending stress generated when the core portion 302 is rotated under the condition that the core portion 302 is curved by the weight thereof or the bending vibration, the thermal stress due to the temperature difference between the outer side and the inner side of the core portion 302 at the operation of the turbine generator, or the residual stress in the core portion 302. Therefore, such a technique as removing the crack 309 created at the contacting surface 307 of the core portion 302 at the scheduled outage is disclosed (e.g., refer to U.S. Pat. No. 6,849,972).

With the conventional crack removing method as disclosed in Patent document No. 1, the surrounding area of the crack 309 is defined in dependent on the condition and the size of the crack 309, and removed, as shown in FIGS. 17 and 18. The surrounding area is turned into a crack removed area 310 after the removal.

Moreover, it is disclosed that some ditches for stress relaxation are formed at the corresponding contacting edge 308 in the side of the core portion 302 so that the tensile stress and the compressive stress due to the relative slip between the corresponding wedge 305 and the core portion 302 of the rotor 300 can not be concentrated onto the corresponding contacting edge 308 (e.g., refer to JP-B 4-29304 (KOKOKU)). In addition, some techniques as mitigating or preventing the fretting fatigue at the contacting surface 307 in the side of the core portion 302 are disclosed (e.g., refer to JP-B 5-74304(KOKOKU), JP-B 7-40774(KOKOKU) and JP-B 7-44802(KOKOKU)).

With the conventional technique where the crack 309 created at the contacting surface 307 in the side of the core portion 302 of the rotor 300 is removed, the fine processing for the minute space inside the slot 303 is required so that the processing efficiency is deteriorated. With the conventional technique relaxing the concentration of the tensile stress and the compressive stress at the contacting edge 308 due to the relative slip between the wedge 305 and the core portion 302 or mitigating or preventing the fretting fatigue at the contacting surface 307 in the side of the core portion 302, some cracks due to the fretting fatigue may be mitigated or prevented, but no crack can be removed and the crack growth can not be prevented.

SUMMARY

It is an object of the present invention, in view of the above-described problems, to provide a method for repairing cracks in an electromechanical rotor and a method for preventing the crack growth in the electromechanical rotor where some cracks created at the contacting surface between the core portion and the corresponding wedge can be easily removed and the growth of the cracks can be prevented by processing the core portion from the outside. It is also an object of the present invention to provide an electromechanical rotor and a rotary electrical machine where some cracks are removed by the crack repairing method.

In order to achieve the above object, an aspect of the present invention relates to a method for repairing cracks in an electromechanical rotor includes: forming a plurality of slots on a periphery of a core portion of an electromechanical rotor along an axial direction thereof; inserting coils into the slots, respectively; forming a plurality of wedges for maintaining the coils in the slots, respectively; and forming a cut hole at the core portion from an outer surface of the core portion so as to remove at least a deeper area of a crack created at the core portion at a contacting surface between the corresponding wedge and the corresponding slot.

According to the aspect of the repairing method of the present invention, an electromechanical rotor including a repaired crack by the repairing method and a rotary electrical machine including a repaired crack by the repairing method can be provided.

In order to achieve the above object, another aspect of the present invention relates to a method for preventing crack growth in an electromechanical rotor includes: forming a plurality of slots on a periphery of a core portion of an electromechanical rotor along an axial direction thereof; inserting coils into the slots, respectively; forming a plurality of wedges for maintaining the coils in the slots, respectively; and forming a cut hole at the core portion from an outer surface of the core portion through an area in the vicinity of at least an deeper area of a crack created at the core portion at a contacting surface between the corresponding wedge and the corresponding slot.

According to the aspect of the crack growth preventing method of the present invention, an electromechanical rotor including a crack of which the growth is prevented by the preventing method and a rotary electrical machine including a crack of which the growth is prevented by the repairing method can be provided.

DETAILED DESCRIPTION

Hereinafter, embodiments of the present invention will be described with reference to the drawings. The drawings, though referred to in describing the embodiments of the present invention, are provided only for an illustrative purpose and in no way limit the present invention.

First Embodiment

The first embodiment according to the present invention will be described hereinafter, with reference to FIGS. 1-3. In the first embodiment, a crack repairing method will be described whereby some cracks created at the contacting area between the corresponding wedge and the core portion can be easily removed.

Figure 1:
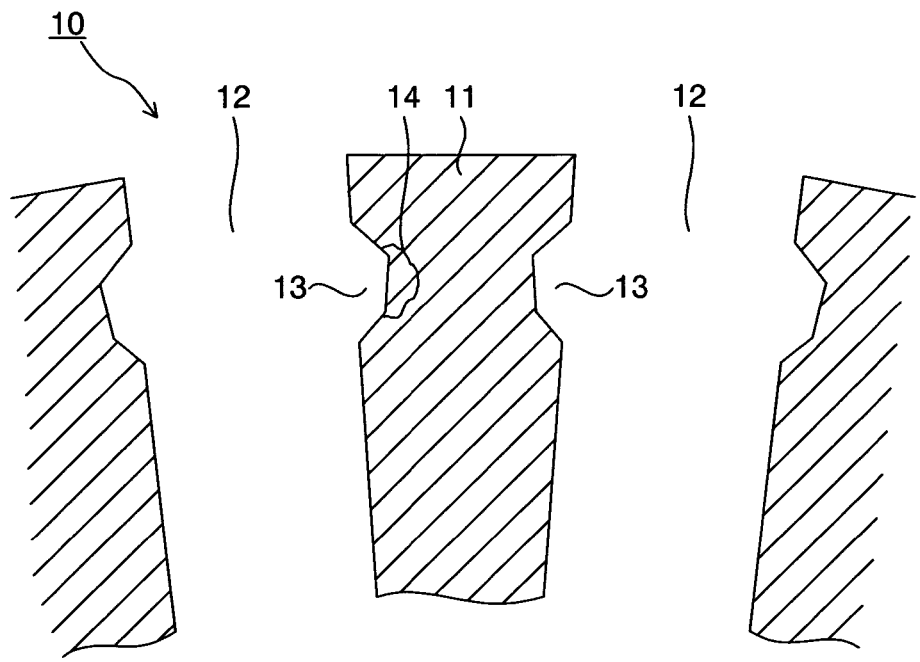
FIG. 1 is a cross-sectional view schematically showing the core portion of an electromechanical rotor according to an embodiment of the present invention along the axial direction thereof when a crack occurs.

FIG. 1 is a cross-sectional view schematically showing the core portion 11 of an electromechanical rotor 10 along the axial direction thereof when a crack 14 occurs. FIG. 2 is also a cross-sectional view schematically showing the core portion 11 of the electromechanical rotor 10 along the axial direction thereof after the crack 14 is removed. FIG. 3 is a cross-sectional view schematically showing the core portion 11 of the electromechanical rotor 10 along the axial direction thereof when a filling member 25 is welded into a cut hole 20 formed by partially removing the core portion 11.

Figure 2:
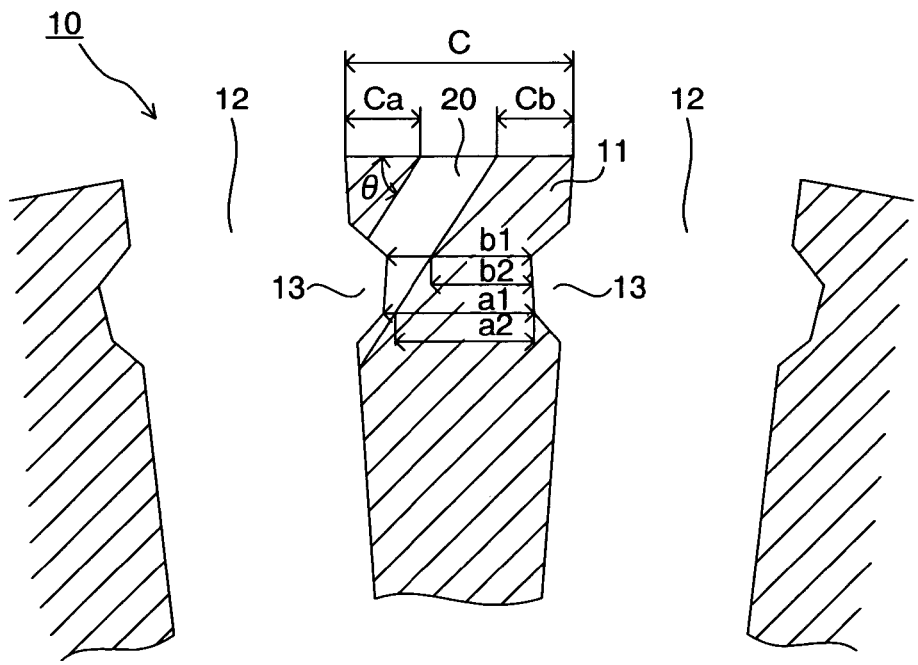
FIG. 2 is also a cross-sectional view schematically showing the core portion of the electromechanical rotor according to the embodiment of the present invention along the axial direction thereof after the crack is removed.

As shown in FIGS. 1 and 2, the electromechanical rotor 10 includes a plurality of core portions 11 which are arranged subsequently by a given pitch in the circumferential direction and radially toward the center axis. Then, a plurality of slots 12 are provided in the corresponding spaces between the adjacent core portions 11 along the axial direction. Each slot 12 contains a coil and a wedge provided on the outer side of the coil in the radial direction via an insulating layer. The wedge can prevent the coil from being dropped off from in the corresponding slot in the radial direction if the centrifugal force affects the slot when the electromechanical rotor 10 is rotated. The wedge may be formed in dove tail-shape, T-shape, Christmas tree-shape and the like.

Then, since a plurality of ditches 13 are formed at each slot 12 and a plurality of wedges are provided in the corresponding ditches, the contacting edges are formed between the adjacent wedges at the corresponding contacting surfaces between the wedges and the slots 12. As shown in FIG. 1, surface pressures, originated from the centrifugal force, affect the contacting edges, respectively, and relative slips occur between the slots 12 (the core portions 11) and the wedges, respectively, when the core portions 11 of the electromechanical rotor 10 are rotated under the condition that the core portions 11 are curved due to the weight thereof or the bending vibration thereof. In this case, relatively large tensile stresses and compressive stresses may occur and concentrated at the sides of the core portions 11 of the contacting edges so that a fretting damage occurs at the stress concentrating area of the corresponding core portion 11 and thus, a crack 14 occurs at the same area.

Then, the repairing method for the crack 14 will be described with reference to FIG. 2.

As shown in FIG. 2, a cut hole 20 is formed at the corresponding core portion 11 from the outer surface thereof toward the crack 14. The minimum processing diameter of the cut hole 20 is restricted to about 3 mm because of the processing limitation. The diameter of the cut hole 20 and the processing angle θ of the cut hole 20 for the outer surface of the core portion 11 are determined as the additional value $(Ca+Cb)$ of the outer thickness Ca and Cb of the remaining core portion 11 after the cut hole processing is set to 20% or over for the initial outer thickness C of the core portion 11 before the cut hole processing (the ratio of $(Ca+Cb)/C$ is set to 0.2 or over). Herein, either of the thickness Ca and the thickness Cb may be set to zero. In addition, the diameter of the cut hole 20 and the processing angle θ of the cut hole 20 for the outer surface of the core portion 11 are determined as the thickness b2 of the outer portion and the thickness a2 of the inner portion in the remaining ditch 13 in the radial direction after the cut hole processing are set to 50% or over for the initial thickness b1 of the outer portion and the initial thickness a1 of the inner portion in the initial ditch 13 in the radial direction before the cut hole processing, respectively (i.e., the ratio of a2/a1 and the ratio of b2/b1 are set to 0.5 or over, respectively).

The upper portion of the corresponding slot 12 in the vicinity of the core portion 11 for the cut hole 20 to be formed is subject to the bending stress when the core portions 11 are rotated under the condition that the core portions 11 are curved by the weight thereof or the bending vibration, the thermal stress due to the temperature difference between the outer side and the inner side of the core portion 11, the high frequency cyclic fatigue originated from the axial stress such as a residual stress in the core portion 11 and low frequency cyclic fatigue originated from the fluctuation of the centrifugal force against the slot 12 at the start-and-stop control. In this case, if the additional value $(Ca+Cb)$ of the outer thickness Ca and Cb of the remaining core portion 11 after the cut hole processing is set to 20% or over for the initial outer thickness C of the core portion 11 before the cut hole processing (the ratio of $(Ca+Cb)/C$ is set to 0.2 or over) and the thickness b2 of the outer portion and the thickness a2 of the inner portion in the remaining ditch 13 in the radial direction after the cut hole processing are set to 50% or over for the initial thickness b1 of the outer portion and the initial thickness a1 of the inner portion in the initial ditch 13 in the radial direction before the cut hole processing, respectively (i.e., the ratio of a2/a1 and the ratio of b2/b1 are set to 0.5 or over, respectively), the high frequency cyclic fatigue and the low frequency cyclic fatigue can be removed. The cut hole processing can be carried out by means of processing machine such as drilling machine or laser.

According to the repairing method for the crack 14 created at the core portion 11 as described above, since the crack 14 can be removed from the outer surface of the core portion 11, the crack 14 can be easily repaired so that the operationality of the crack repairing can be enhanced. After the crack 14 is repaired, the mechanical strength of the core portion 11 (i.e., the electromechanical rotor 10) can be maintained.

Figure 3:
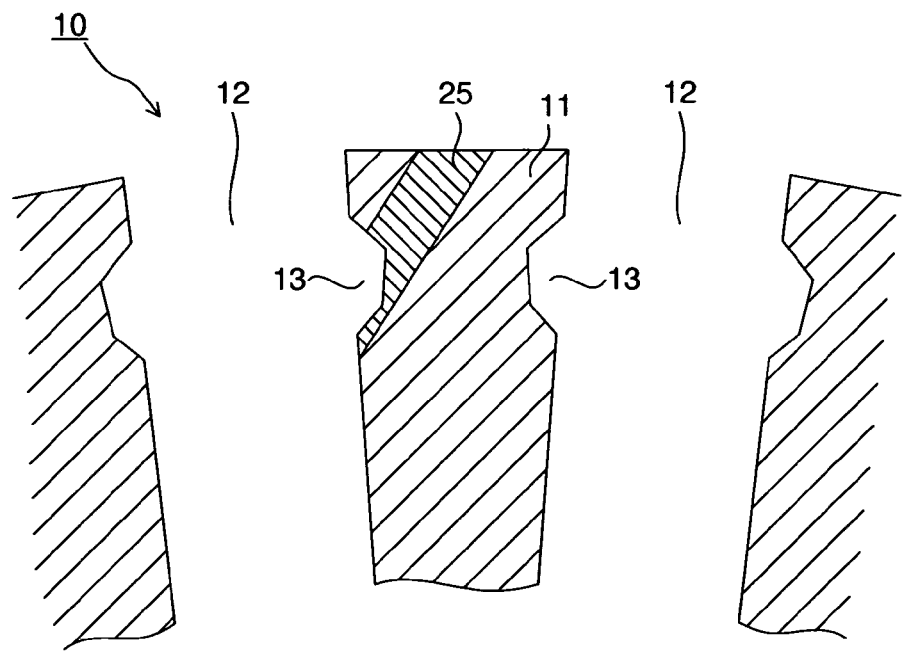
FIG. 3 is a cross-sectional view schematically showing the core portion of an electromechanical rotor according to an embodiment of the present invention along the axial direction thereof when a filling member is welded into a cut hole formed by partially removing the core portion.

As shown in FIG. 3, a filing member 25 is adhered into the cut hole 20 through melting. The shape and the size of the filling member 25 is set almost equal to the ones of the cut hole 20. Particularly, when the cut hole 20 is penetrated through the core portion 11 in the side of the ditch 13, the shape and the size of the filling member 25 is set so that the filling member 25 is not projected from the cut hole 20 in the side of the ditch 13. In view of the weight balance between the filling member 25 and the core portion 11, it is desired that the filing member 25 is made of the same material as the core portion 11 or the almost same relative density material as the core portion 11.

In this embodiment, although the filling member 25 is adhered into the cut hole 20 by the melting, the filling member 25 may be adhered into the cut hole 20 by another means. For example, an internal thread is formed at the inner wall of the cut hole 20 and an external thread is formed at the side surface of the filling member 25 so that the filling member 25 can be engaged with the cut hole 20.

In this way, if the filling member 25 is adhered into the cut hole 20, the weight balance between the core portions 11 with the cut hole 20 and without the cut hole 20 can be maintained. Then, the current flowed in the outer surface of the core portion 11 with the cut hole 20 can be set to the one of the core portion 11 without the cut hole 20. Also, the ventilation resistance on the outer surface of the core portion 11 with the cut hole 20 can be set to the one of the core portion 11 without the cut hole 20.

In the repairing method for the crack 14 created at the coreportion 11 as described above, the crack 14 is removed entirely, but may be removed partially. For example, only the deep area of the crack 14 may be removed. The "deep area" means a deep area of the core portion 11 in the radial direction and in the side of the central axis, and/or in the circumferential direction. In other words, the "deep area" means a portion of the crack 14 which grows deeper toward the inner side of the core portion 11 in the circumferential direction.

Then, the repairing method for the deeper portion of the crack 14 will be described with reference to FIGS. 4-7.

First of all, the repairing method of the forefront 14a of the crack 14 formed at the core portion 11 in the circumferential direction will be described with reference to FIGS. 4 and 5.

Figure 4:
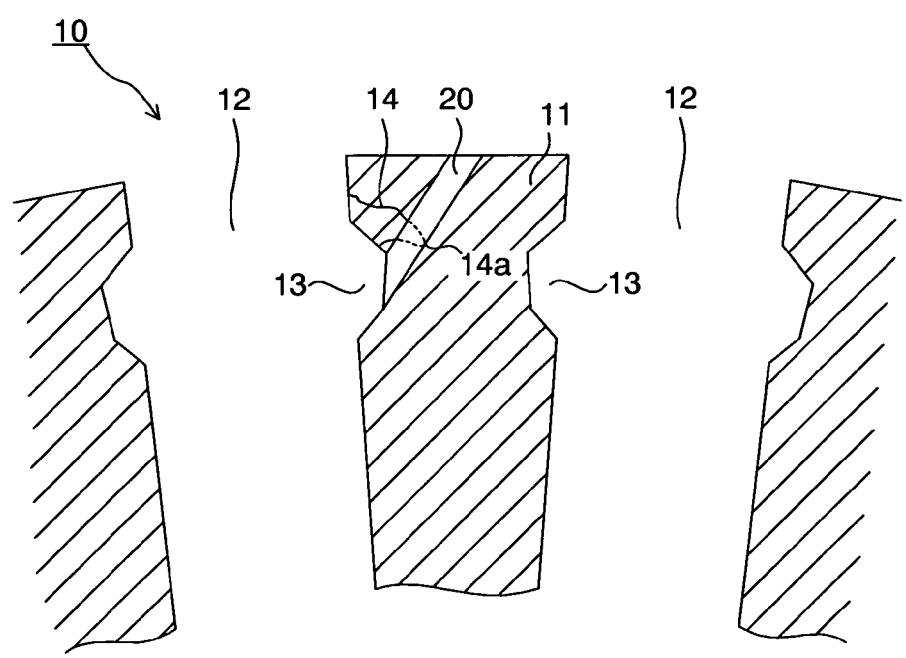
FIG. 4 is a cross-sectional view schematically showing the core portion of an electromechanical rotor according to an embodiment of the present invention along the axial direction thereof when a deeper area of the core portion in the circumferential direction, in which a crack occurred, is removed.
Figure 5:
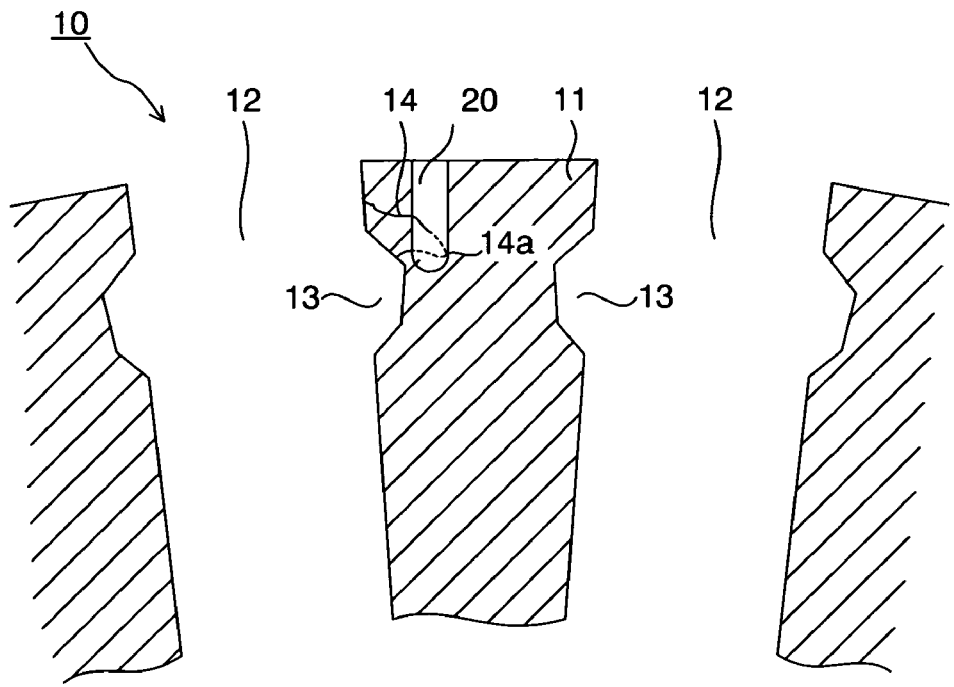
FIG. 5 is also a cross-sectional view schematically showing the core portion of an electromechanical rotor according to an embodiment of the present invention along the axial direction thereof when a deeper area of the core portion in the circumferential direction, in which a crack occurred, is removed.

FIGS. 4 and 5 are cross-sectional views schematically showing the electromechanical rotor 10 along the axial direction thereof when the forefront 14a of the crack 14 formed at the core portion 11 in the circumferential direction is removed.

As shown in FIG. 4, the cut hole 20 is formed at the core portion 11 from the outer surface of the core portion 11 toward the forefront 14a of the crack 14 formed at the core portion 11 in the circumferential direction so as to remove the forefront 14a. In this case, the cut hole 20 is penetrated through the core portion 11 in the side of the ditch 13. It is desired to form the cut hole 20 so that the inner wall of the cut hole 20 is contacted with the forefront 14a of the crack 14, thereby removing the forefront 14a and the inner portion of the crack 14 from the forefront 14a within the cut hole 20. However, it is required to remove at least the forefront 14a of the crack 14.

The forefront 14a of the crack 14 formed at the core portion 11 may be removed by another means. As shown in FIG. 5, for example, the cut hole 20 may be formed so that the end portion of the cut hole 20 reaches the forefront 14a not through the core portion 11. In this case, too, the forefront 14a of the crack 14 can be removed effectively and efficiently. Also, it is desired to form the cut hole 20 so that the inner wall of the cut hole 20 is contacted with the forefront 14a of the crack 14, thereby removing the forefront 14a and the inner portion of the crack 14 from the forefront 14a within the cut hole 20. The shape of the end portion of the cut hole 20 may be preferably formed in semi-circle.

Then, the repairing method of the forefront 14b of the crack 14 formed at the core portion 11 in the radial direction and in the side of the center axis will be described with reference to FIG. 6.

Figure 6:
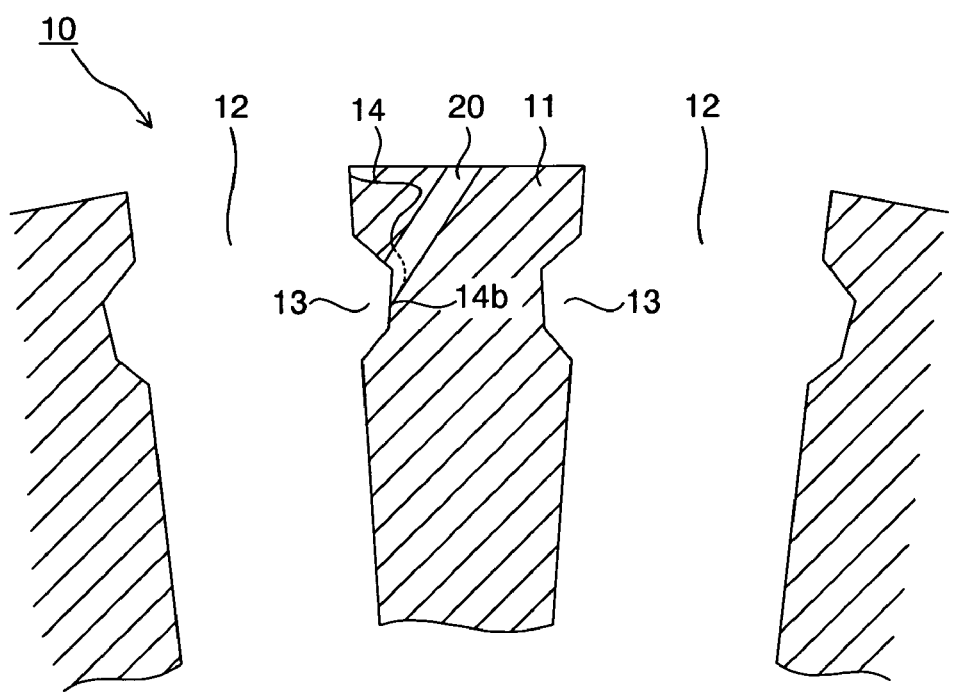
FIG. 6 is a cross-sectional view schematically showing the core portion of an electromechanical rotor according to an embodiment of the present invention along the axial direction thereof when a deeper area of the core portion in the radial direction and in the side of the center axis, in which a crack occurred, is removed.

FIG. 6 is a cross-sectional view schematically showing the electromechanical rotor 10 along the axial direction thereof when the forefront 14b of the crack 14 formed at the core portion 11 in the radial direction and in the side of the center axis is removed.

As shown in FIG. 6, the cut hole 20 is formed at the core portion 11 from the outer surface of the core portion 11 toward the forefront 14b of the crack 14 formed at the core portion 11 in the radial direction and in the side of the center axis so as to remove the forefront 14b. In this case, the cut hole 20 is penetrated through the core portion 11 in the side of the ditch 13. It is desired to form the cut hole 20 so that the inner wall of the cut hole 20 is contacted with the forefront 14b of the crack 14, thereby removing the forefront 14b and the inner portion of the crack 14 from the forefront 14b with in the cut hole 20. However, it is required to remove at least the forefront 14b of the crack 14.

The forefront 14b of the crack 14 formed at the core portion 11 may be removed by another means. As shown in FIG. 5, for example, the cut hole 20 may be formed so that the end portion of the cut hole 20 reaches the forefront 14b not through the core portion 11.

Then, the repairing method of the forefront 14a of the crack 14 formed at the core portion 11 in the circumferential direction and the forefront 14b of the crack 14 formed at the core portion 11 in the radial direction and the side of the center axis will be described with reference to FIG. 7.

Figure 7:
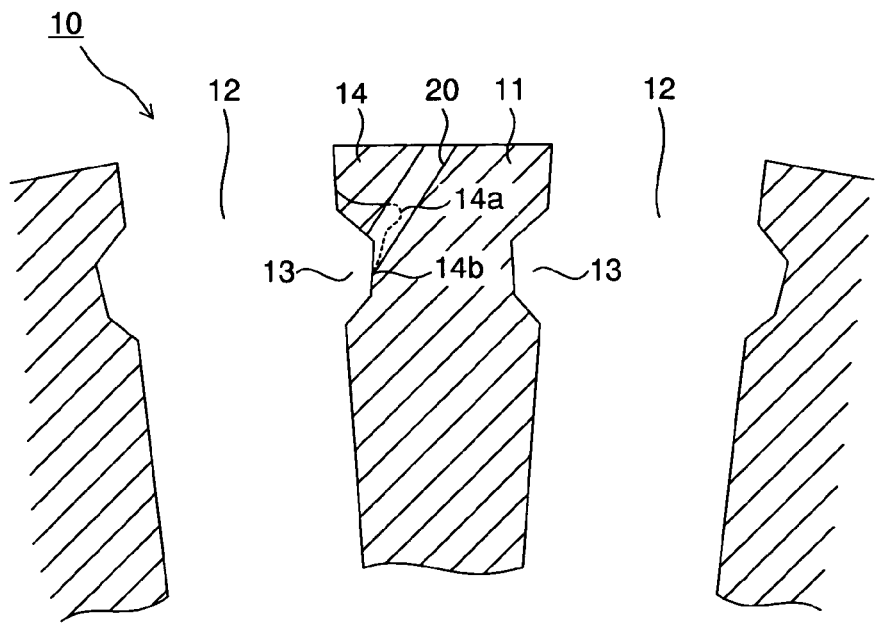
FIG. 7 is a cross-sectional view schematically showing the core portion of an electromechanical rotor according to an embodiment of the present invention along the axial direction thereof when a deeper area of the core portion in the circumferential direction, in which a crack occurred, is removed and a deeper area of the core portion in the radial direction and in the side of the center axis, in which a crack occurred, is removed.

FIG. 7 is a cross-sectional view schematically showing the electromechanical rotor 10 along the axial direction thereof when the forefront 14a of the crack 14 formed at the core portion 11 in the circumferential direction is removed and the forefront 14b of the crack 14 formed at the core portion 11 in the radial direction and in the side of the center axis is removed.

As shown in FIG. 7, the cut hole 20 is formed at the core portion 11 from the outer surface of the core portion 11 toward the forefront 14a of the crack 14 formed at the core portion 11 in the circumferential direction and the forefront 14b of the crack 14 formed at the core portion 11 in the radial direction and in the side of the center axis so as to remove the forefronts 14a and 14b. In this case, the cut hole 20 is penetrated through the core portion 11 in the side of the ditch 13. It is desired to form the cut hole 20 so that the inner wall of the cut hole 20 is contacted with the forefront 14a and/or the forefront 14b of the crack 14. However, it is required to remove at least the forefronts 14a and 14b of the crack 14.

The forefronts 14a and 14b of the crack 14 formed at the core portion 11 may be removed by another means. As shown in FIG. 5, for example, the cut hole 20 may be formed so that the end portion of the cut hole 20 reaches the forefronts 14a and 14b not through the core portion 11.

In the removal of the forefronts 14a and 14b of the crack 14, it is desired to form the cut hole 20 so that the additional value (Ca+Cb) of the outer thickness Ca and Cb of the remaining core portion 11 after the cut hole processing is set to 20% or over for the initial outer thickness C of the core portion 11 before the cut hole processing (the ratio of (Ca+Cb)/C is set to 0.2 or over), and the thickness b2 of the outer portion and the thickness a2 of the inner portion in the remaining ditch 13 in the radial direction after the cut hole processing are set to 50% or over for the initial thickness b1 of the outer portion and the initial thickness a1 of the inner portion in the initial ditch 13 in the radial direction before the cut hole processing, respectively (i.e., the ratio of a2/a1 and the ratio of b2/b1 are set to 0.5 or over, respectively). The minimum processing diameter of the cut hole 14 is restricted to about 3 mm because of the processing limitation.

According to the repairing method for the crack 14 created at the core portion 11 as described above, since the crack 14 can be removed from the outer surface of the core portion 11, the crack 14 can be easily repaired so that the operationality of the crack repairing can be enhanced. Moreover, since the forefront 14a of the crack 14 formed at the core portion 11 in the circumferential direction is removed and the forefront 14b of the crack 14 formed at the core portion 11 in the radial direction and in the side of the center axis, the growth of the crack 14 can be prevented.

In this embodiment, the filling member 25 can be adhered into the cut hole 20 through melting or engagement.

Second Embodiment

A second embodiment according to the present invention will be described with reference to FIGS. 8-10. In this embodiment, a crack growth preventing method will be described whereby the growth of cracks created at the contacting area between the corresponding wedge and the core portion can be easily removed. The same reference numerals are imparted to like or corresponding components throughout the drawings of the present application. In this point of view, the explanation for like or corresponding components will be omitted.

Figure 8:
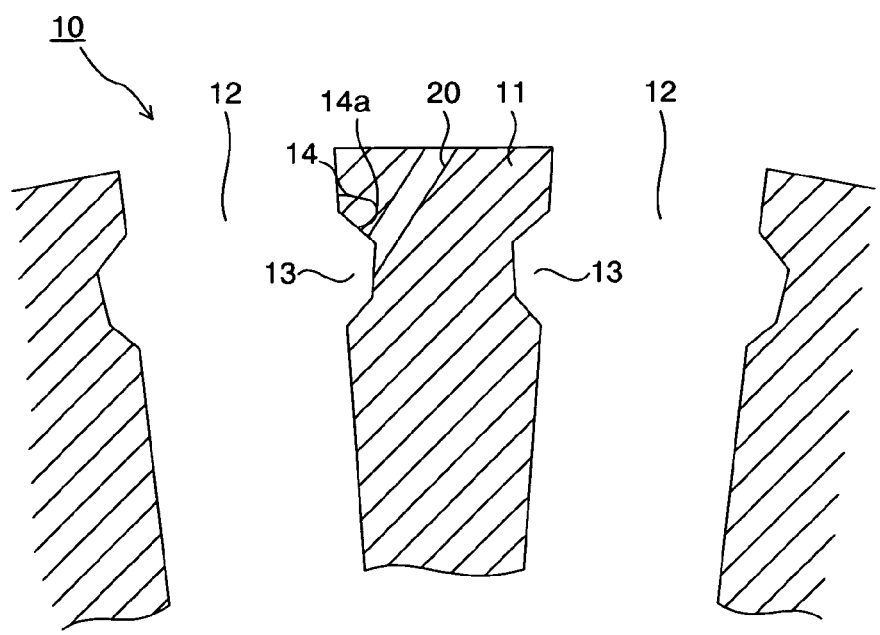
FIG. 8 is a cross sectional view schematically showing the core portion of an electromechanical rotor according to an embodiment of the present invention along the axial direction thereof when a cut hole is formed so as to prevent the crack growth.

FIG. 8 is a cross sectional view schematically showing the electromechanical rotor 10 along the axial direction thereof when a cut hole is formed so as to prevent the crack growth.

As shown in FIG. 8, the cut hole 20 is formed at the core portion 11 from the outer surface of the core portion 11 toward the deeper area of the crack 14. The "deep area" means a deep area of the core portion 11 in the radial direction and in the side of the central axis, and/or in the circumferential direction. In other words, the "deep area" means a portion of the crack 14 which grows deeper toward the inner side of the core portion 11 in the circumferential direction. Therefore, the cut hole 20 is formed so as to reach the forefront 14a of the crack 14 formed at the core portion 11 and/or the area around the forefront 14b of the crack 14 formed at the core portion 11 in the radial direction and in the side of the center axis or the forefronts 14a and 14b. The areas around the forefront areas 14a and 14b does not include other cracks, respectively, and ranges within a several mm.

First of all, a first crack growth preventing method will be described with reference to FIGS. 8 and 9. In this embodiment, the cut hole 20 is formed in the vicinity of the forefront 14a of the crack 14 formed at the core portion 11 of the electromechanical rotor 10 in the circumferential direction.

Figure 9:
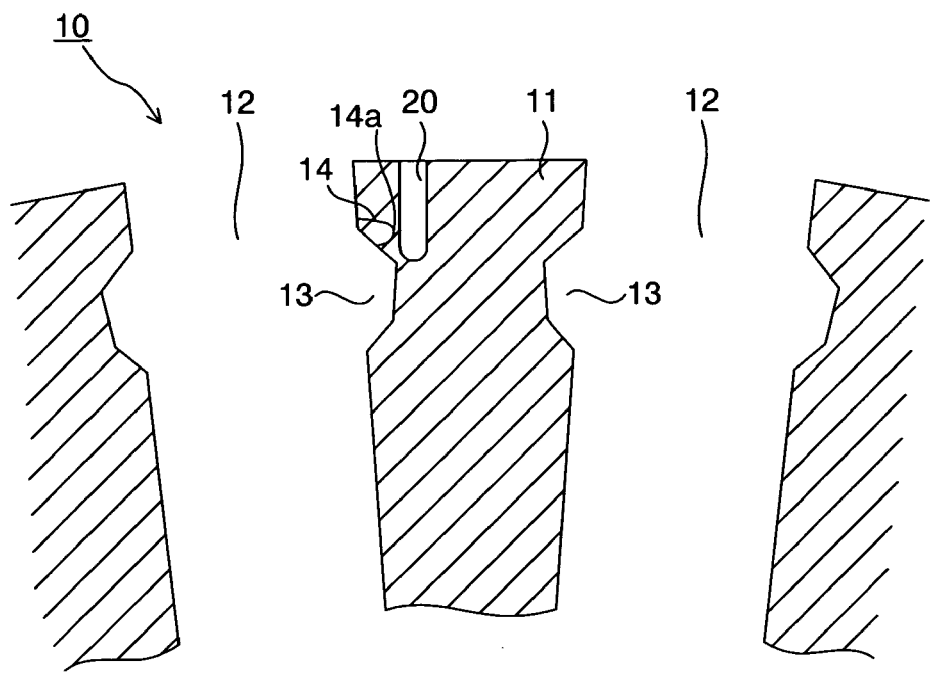
FIG. 9 is also a cross sectional view schematically showing the core portion of an electromechanical rotor according to an embodiment of the present invention along the axial direction thereof when a cut hole is formed so as to prevent the crack growth.

FIGS. 8 and 9 are cross sectional views schematically showing the core portion 11 of the rotor 10 along the axial direction thereof when the cut hole is formed in the vicinity of the forefront 14a of the crack 14 formed at the core portion 11.

As shown in FIG. 8, the cut hole 20 is formed so as to penetrate the core portion 11 through the area in the vicinity of the forefront 14a of the crack 14 in the circumferential direction from the outer surface of the core portion 11 toward the side of the ditch 13.

The preventing of the growth of the crack 14 may be conducted by another means in addition to the above-mentioned cut hole formation in the vicinity of the forefront area 14a. As shown in FIG. 9, for example, the cut hole 20 may be formed so that the end portion of the cut hole 20 is located in the vicinity of the forefront 14a not through the core portion 11. In this case, the end portion of the cut hole 20 may be located in the side of the center axis in the radial direction from the forefront 14a of the crack 14. In this way, if the cut hole 20 is formed deeper than the forefront 14a of the crack 14, the growth of the crack 14 can be prevented even though the shape of the crack 14 is indefinite. The shape of the end portion of the cut hole 20 may be preferably formed in semi-circle.

Then, a second crack growth preventing method will be described with reference to FIG. 10. In this embodiment, the cut hole 20 is formed in the vicinity of the forefront 14b of the crack 14 formed at the core portion 11 of the electromechanical rotor 10 in the radial direction and in the side of the center axis.

Figure 10:
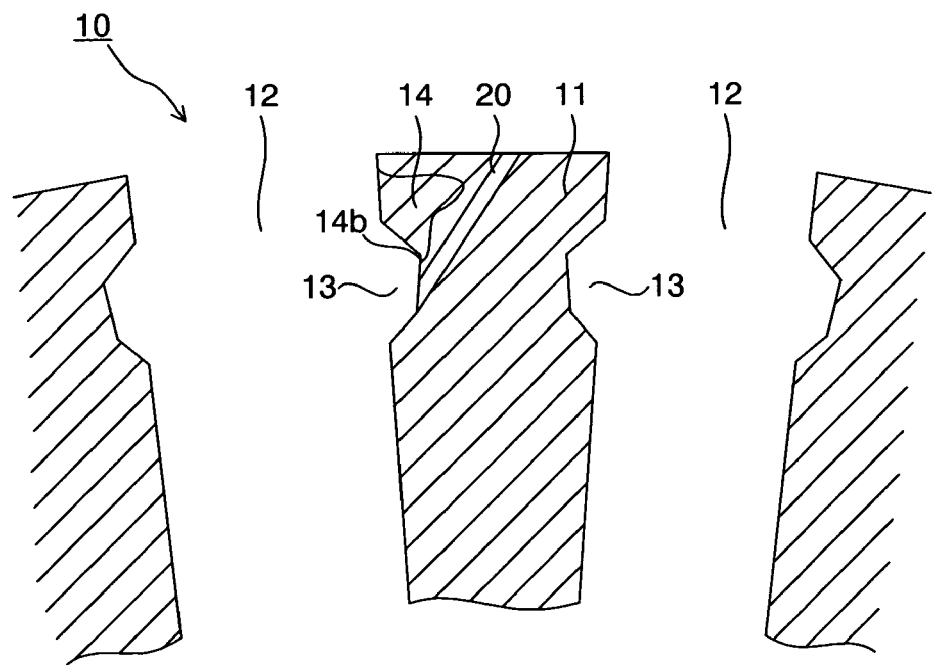
FIG. 10 is also a cross sectional view schematically showing the core portion of an electromechanical rotor according to an embodiment of the present invention along the axial direction thereof when a cut hole is formed in the vicinity of the deeper area, in which a crack occurred, in the radial direction and in the side of the center axis.

FIG. 10 is a cross sectional view schematically showing the core portion 11 of the electromechanical rotor 10 along the axial direction thereof when the cut hole 20 is formed so as to penetrate the core portion 11 through an area in the vicinity of the forefront 14b in the radial direction and in the side of the center axis.

As shown in FIG. 10, the cut hole 20 is formed so as to penetrate the core portion 11 through the area in the vicinity of the forefront 14b of the crack 14 in the radial direction and in the side of the center axis from the outer surface of the core portion 11 toward the side of the ditch 13.

The preventing of the growth of the crack 14 may be conducted by another means in addition to the above-mentioned cut hole formation in the vicinity of the forefront 14b. As shown in FIG. 9, for example, the cut hole 20 may be formed so that the end portion of the cut hole 20 is located in the vicinity of the forefront 14b not through the core portion 11. In this case, the end portion of the cut hole 20 may be located in the side of the center axis in the radial direction from the forefront 14a of the crack 14.

Then, a third crack growth preventing method will be described with reference to FIG. 11. In this embodiment, the cut hole 20 is formed in the vicinity of the forefront 14a of the crack 14 formed at the core portion 11 of the electromechanical rotor 10 in the circumferential direction and in the vicinity of the forefront 14b of the crack 14 formed at the core portion 11 of the electromechanical rotor 10 in the radial direction and in the side of the center axis.

Figure 11:
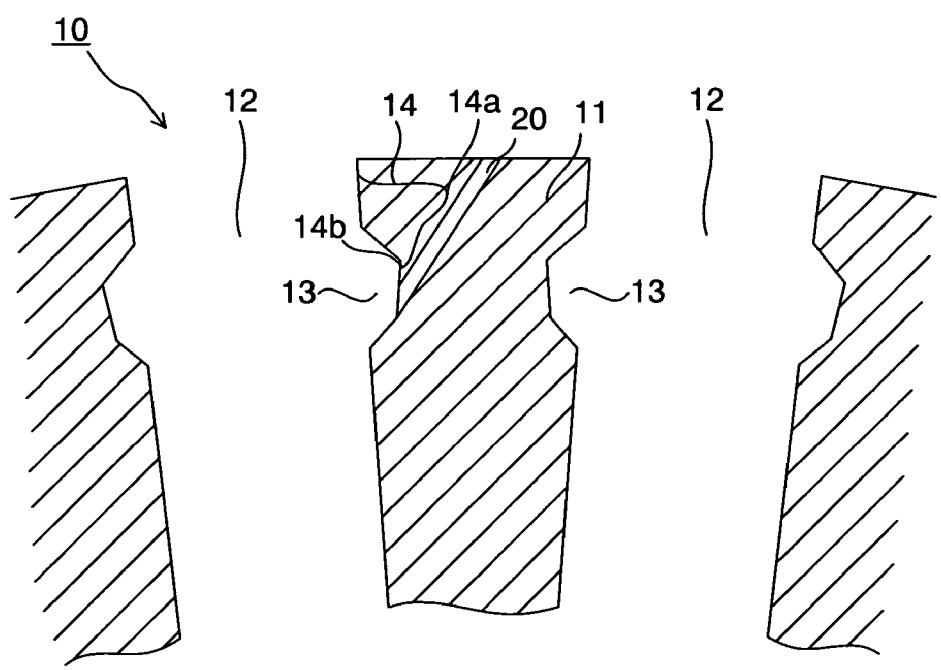
FIG. 11 is also a cross sectional view schematically showing the core portion of an electromechanical rotor according to an embodiment of the present invention along the axial direction thereof when a cut hole is formed in the vicinity of the deeper area, in which a crack occurred, in the circumferential direction and in the vicinity of the deeper area, in which a crack occurred, in the radial direction and in the side of the center axis.
Figure 12:
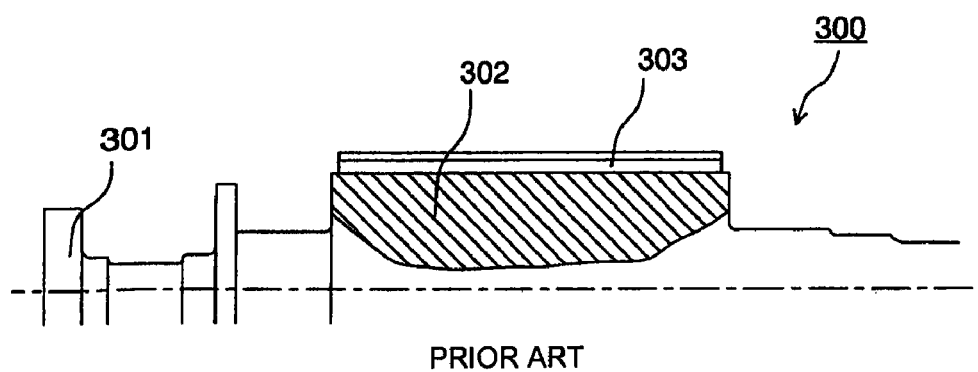
FIG. 12 is a cross sectional view schematically showing a portion of a rotor of a conventional turbine generator.
Figure 13:
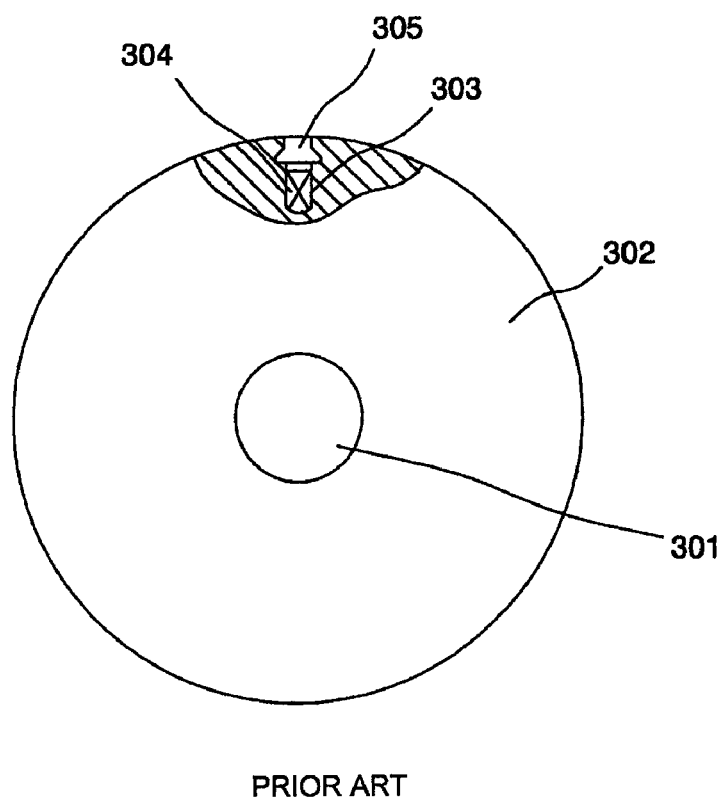
FIG. 13 is a partially cut away plan view schematically showing the rotor shown in FIG. 12.
Figure 14:
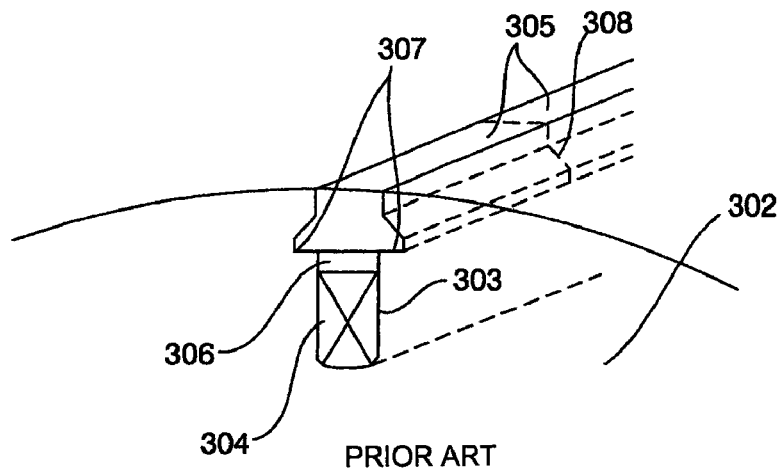
FIG. 14 is a perspective view schematically showing the fabrication state between the slot and the wedge in the rotor shown in FIG. 13.
Figure 15:
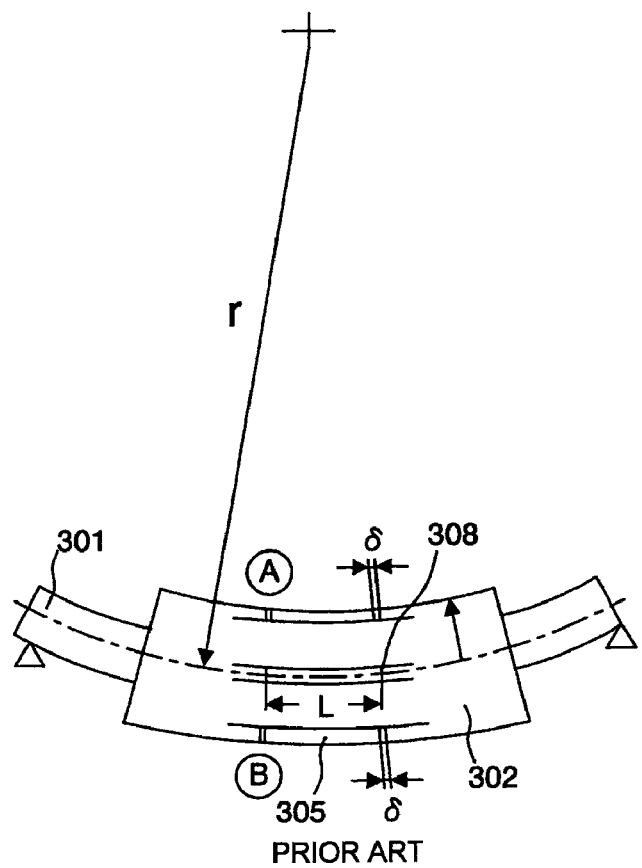
FIG. 15 is a plan view showing the rotor shaft under deformation.
Figure 16:
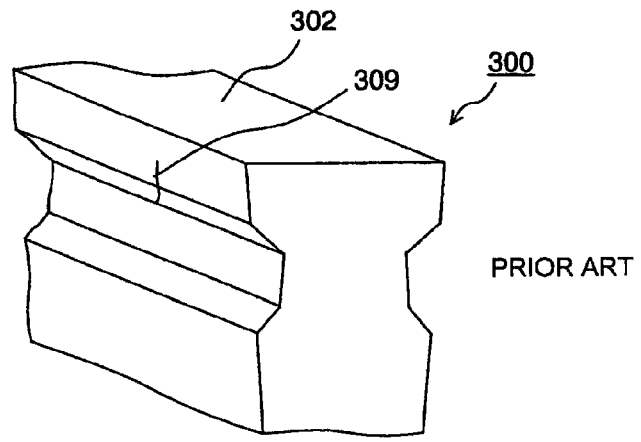
FIG. 16 is a perspective view showing the conventional rotor of the turbine generator with a crack created at the rotor dove tail thereof.
Figure 17:
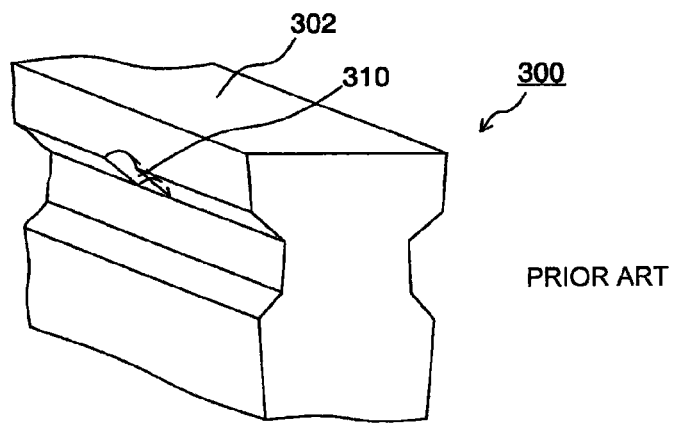
FIG. 17 is a perspective view of the conventional rotor for explaining a conventional repairing method for a crack created at the rotor dove tail thereof.
Figure 18:
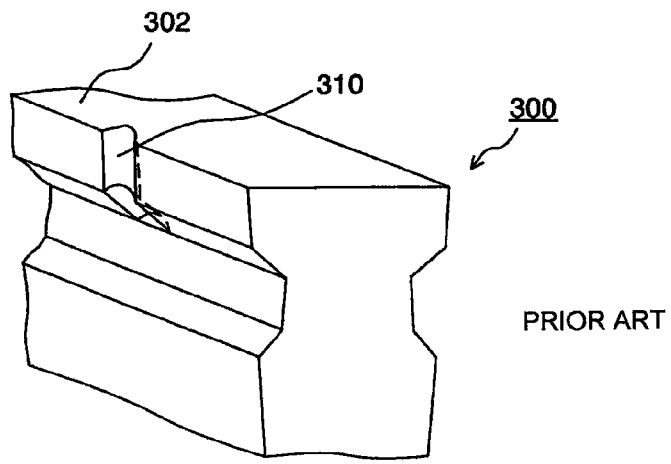
FIG. 18 is also a perspective view of the conventional rotor for explaining a conventional repairing method for a crack created at the rotor dove tail thereof.

FIG. 11 is a cross sectional view schematically showing the core portion 11 of the electromechanical rotor 10 along the axial direction thereof when the cut hole 20 is formed in the vicinity of the forefront 14a of the crack 14 formed at the core portion 11 in the circumferential direction and in the vicinity of the forefront 14b of the crack 14 formed at the core portion 11 in the radial direction and in the side of the center axis.

As shown in FIG. 11, the cut hole 20 is formed so as to penetrate the core portion 11 through the area in the vicinity of the forefront 14a of the crack 14 in the circumferential direction and the area in the vicinity of the forefront 14b of the crack 14 in the radial direction and in the side of the center axis from the outer surface of the core portion 11 toward the side of the ditch 13.

The preventing of the growth of the crack 14 may be conducted by another means in addition to the above-mentioned cut hole formation in the vicinity of the forefronts 14a and 14b. As shown in FIG. 9, for example, the cut hole 20 may be formed so that the end portion of the cut hole 20 is located in the vicinity of the forefronts 14a and 14b not through the core portion 11.

In those embodiments relating to the crack growth preventing method, it is desired to form the cut hole 20 so that the additional value (Ca+Cb) of the outer thickness Ca and Cb of the remaining core portion 11 after the cut hole processing is set to 20% or over for the initial outer thickness C of the core portion 11 before the cut hole processing (the ratio of (Ca+Cb)/C is set to 0.2 or over), and the thickness b2 of the outer portion and the thickness a2 of the inner portion in the remaining ditch 13 in the radial direction after the cut hole processing are set to 50% or over for the initial thickness b1 of the outer portion and the initial thickness a1 of the inner portion in the initial ditch 13 in the radial direction before the cut hole processing, respectively (i.e., the ratio of a2/a1 and the ratio of b2/b1 are set to 0.5 or over, respectively). The minimum processing diameter of the cut hole 14 is restricted to about 3 mm because of the processing limitation.

According to the crack growth preventing method, since the cut hole 20 is formed from the outer surface of the core portion 11, the growth of the crack 14 can be easily prevented so that the operationality of the crack growth preventing can be enhanced. Moreover, if the cut hole 20 is formed through the area in the vicinity of the forefront 14a of the crack 14 formed at the core portion 11 in the circumferential direction and/or the area in the vicinity of the forefront 14b of the crack 14 formed at the core portion 11 in the radial direction and in the side of the center axis, the growth of the crack 14 can be prevented.

In the crack growth preventing method, the filling member 25 may be adhered into the cut hole 20 by melting or engagement.

Although the present invention was described in detail with reference to the above examples, this invention is not limited to the above disclosure and every kind of variation and modification may be made without departing from the scope of the present invention. The present invention relating to the crack repairing method and crack growth preventing method can be applied for a normal rotary electrical machine such as an electric motor or an electric generator.

What is claimed is:

1. A method for repairing a crack in an electromechanical rotor, comprising:
   providing an electromechanical rotor, the electromechanical rotor having
   a core portion,
   a plurality of slots formed on an outer surface of the core portion along an axial direction of the electromechanical rotor, the slots being configured to receive a coil, and
   a groove formed on both side walls of the slots, the groove being configured to hold a wedge for maintaining the coil in the slots,
   the core portion including a crack developed from a contact surface between the wedge and one of the slots; and
   forming a hole on said core portion from the outer surface of said core portion to remove at least a deeper portion of the crack,
   wherein said forming of the hole is performed so that
   an additional value ($C_a+C_b$) of an outer thickness $C_a$ and $C_b$ of a remaining portion between adjacent slots across the hole on the outer surface of said core portion after forming the hole is set to 20% or more of an initial outer thickness C between the adjacent slots on the outer surface of said core portion before forming the hole, and
   a thickness $b_2$ of an outer portion in a radial direction and a thickness $a_2$ of an inner portion in the radial direction of a remaining portion between adjacent slots across the hole in the groove of said core portion after forming the hole are set to 50% or more of an initial thickness $b_1$ of an outer portion in the radial direction and an initial thickness $a_1$ of an inner portion in the radial direction between adjacent slots in the groove of said core portion before forming the hole, respectively.

2. The repairing method as set forth in claim 1,
   wherein said deeper portion of said crack is a forefront of said crack in a circumferential direction of said rotor or a forefront of said crack in a radial direction of said rotor and in a side of a center axis of said rotor.

3. The repairing method as set forth in claim 1, further comprising filling a filling member in said hole formed in said core.

4. The repairing method as set forth in claim 3,
   wherein said filling member is made of the same material as said core portion or the almost same relative density material as said core portion.

* * * * *